United States Patent [19]

Dixon et al.

[11] 4,206,364
[45] Jun. 3, 1980

[54] DEVICE FOR PRODUCING EXTENDED ELONGATED PLASMAS FOR X-RAY LASERS

[75] Inventors: Robert H. Dixon, Bowie; Raymond C. Elton, Potomac, both of Md.; John F. Reintjes, Alexandria, Va.

[73] Assignee: The United States of America as represented by the Secretary of the Navy, Washington, D.C.

[21] Appl. No.: 3,696

[22] Filed: Jan. 16, 1979

[51] Int. Cl.² .................. G03B 41/16; G21G 4/00; H01S 4/00
[52] U.S. Cl. .................. 250/493; 331/94.5 P
[58] Field of Search .................. 250/493; 331/94.5 P

[56] References Cited

U.S. PATENT DOCUMENTS

| | | | |
|---|---|---|---|
| 3,746,860 | 7/1973 | Shatas et al. | 250/493 |
| 3,823,325 | 7/1974 | Wood | 250/493 |
| 3,882,312 | 5/1975 | Kepros et al. | 250/493 |
| 3,961,197 | 6/1976 | Dawson | 250/493 |
| 4,058,486 | 11/1977 | Mallozzi et al. | 250/493 |

Primary Examiner—Alfred E. Smith
Assistant Examiner—T. N. Grigsby
Attorney, Agent, or Firm—R. S. Sciascia; Philip Schneider; Melvin L. Crane

[57] ABSTRACT

A device for producing extended plasmas for x-ray lasers. In an evacuated housing, a pair of tungsten blocks are placed just above a target surface and spaced apart to form a channel. A high power laser beam is focused to a point on the target creating a plasma between the blocks. As the plasma expands away from the target in the z-direction, the tungsten blocks confine the plasma in the y-direction and plasma species of higher stages of ionization are formed into a jet of rectangular x-y cross section in the z-direction by the blocks. The plasma remains confined in the y-dimension or is focused in this direction above the blocks where sufficient amplification occurs to provide x-ray lasing along the x-axis.

30 Claims, 1 Drawing Figure

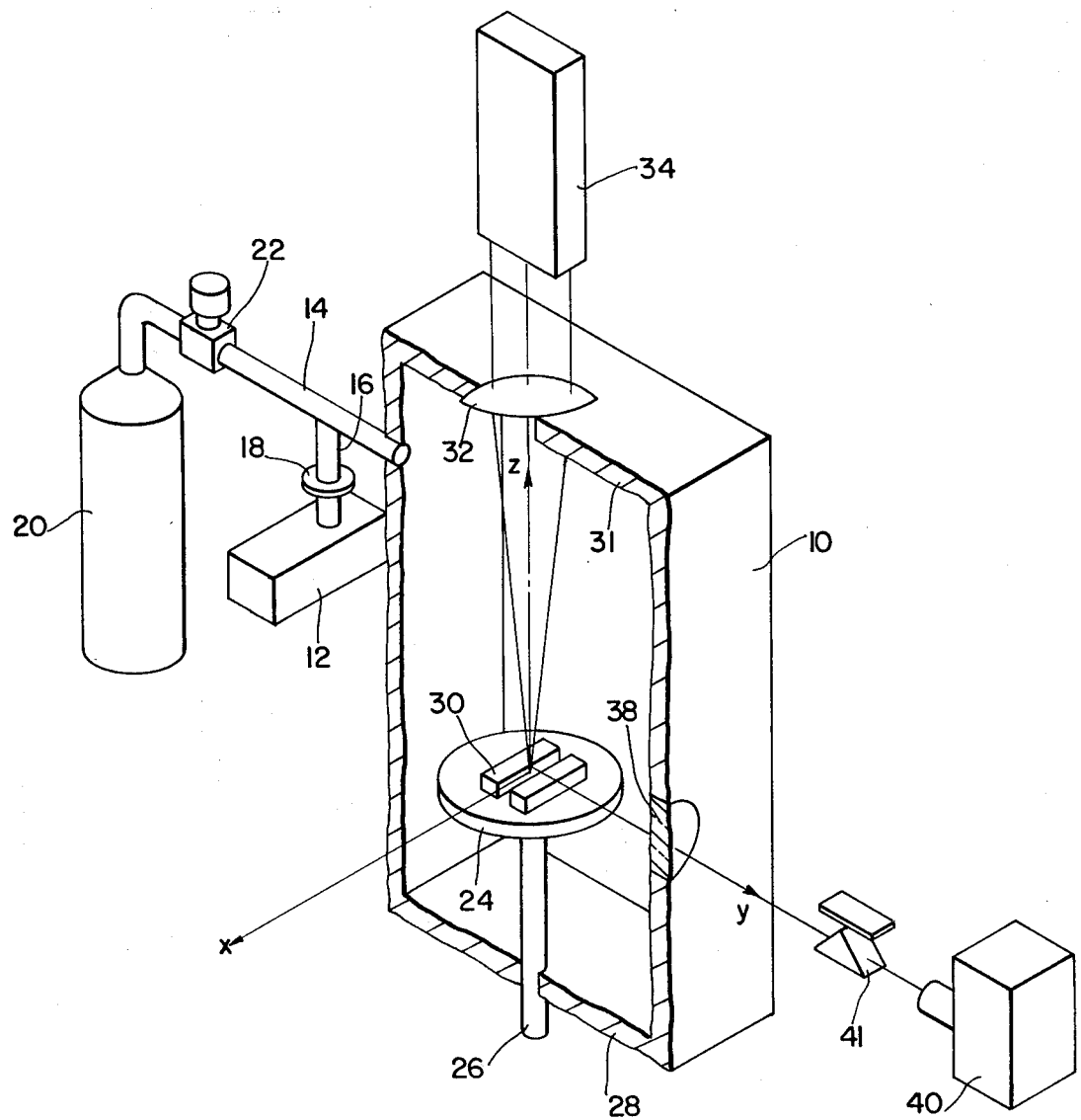

DEVICE FOR PRODUCING EXTENDED ELONGATED PLASMAS FOR X-RAY LASERS

BACKGROUND OF THE INVENTION

This invention relates to lasers and more particularly to a soft x-ray laser.

Heretofore attempts have been made to produce x-ray amplification by an anisotropic spatial distribution in a plasma created by focusing a high-power laser beam in a line on a target. Because of the requirement for sufficiently high intensities at the target, the length of the focused line must be relatively short. It has been determined that plasmas generated in such a focused line are too short near the target to provide significant amplification. In addition, the plasmas are not uniform, they are not reproducible and they undergo interactions with nearby target material resulting in loss of gain. By the time such a line-plasma moves away from the target and has expanded freely in a relaxation mode to a dimension sufficiently large for formation of quasi-cw population inversions and significant gain, it generally becomes spatially isotropic and ionic densities drop to a level too low for useful application as a laser amplifier.

Since the advent lasers, researchers have developed many different types of lasers which are operable over a wide spectrum of different wavelengths. U.S. Pat. No. 3,882,312 is directed to a method of producing collimated x-radiation by suitably subjecting metallic ions to a pulse of laser energy from a conventional laser. This patent indicates that hard x-rays might have developed by irradiating anhydrous copper sulfate confined between two glass plates with a line-focused, Q-switched Nd: glass laser. X-radiation was assumed to be produced from copper ions formed during the laser excitation. However, it has been proven that the patented device does not lase.

The present invention has been set forth in an article, "An Extended Plasma Source for Soft X-ray Lasers" by J. F. Reintjes, R. H. Dixon and R. C. Elton, in *Optics Letters*, vol. 3, page 40, Aug. 1978 and is accordingly incorporated herein by reference.

SUMMARY OF THE INVENTION

This invention makes use of a Nd: glass laser whose output is focused to a sharp point on a target. The focused beam forms a plasma which normally (in free expansion) expands isotropically in a plane parallel to the target surface. Tungsten blocks are placed on each side of the target area with the spacing between the blocks being in the y-direction so that a channel is formed in the x-direction. The tungsten blocks limit the plasma expansion in the y-direction as the plasma expands away from the target in the z-direction. As the plasma expands, suitable population inversions occur so that laser amplification can take place at short wavelengths, and x-rays along the x-axis are produced.

BRIEF DESCRIPTION OF THE DRAWING

The single FIGURE illustrates an x-ray laser system.

DETAILED DESCRIPTION

This invention will be described by reference to the figure which is illustrative of an assemblage of elements necessary to carry out the invention. The assemblage includes a housing 10 which may be evacuated by a vacuum pump 12 through tube 14 which is connected to the housing. A second tube 16 extending from tube 14 to the vacuum pump includes a control valve 18. A gas tank 20 is connected to tube 14 and is provided with a control value 22 by which a gas may be added to the inner confines of the housing. The housing contains a rotatable flat-surface disc 24, made of a suitable material such as carbon, which is supported and rotated by a rod 26 which extends upwardly through the bottom 28 of the housing. A pair of tungsten blocks or other type of material are supported immediately above the rotatable disc 24 in a fixed position relative to the disc. The blocks are fixed such that the center of their spacing is along the x-axis. The disc is rotatable so that a new area of carbon may be positioned within the spacing between the blocks after the previous operation. The blocks remain stationary so that the x-ray laser output is always along the x-direction. Each block has a height of 5 mm, a length of 12 mm and the blocks are spaced 2 mm apart. The side of the housing opposite from the tube 14 is provided with a window 38 whose normal is along the y-axis on a horizontal x-y plane along the upper surface of the tungsten blocks.

The upper end 31 of the housing is provided with a focusing lens 32 through which an output from a 30 J, 30 nsec pulsed Nd: glass laser 34 operating at a wavelength of 1.06 micrometers is projected into the housing along the z-axis. The laser output is focused onto the carbon target at a sharp point, 150 $\mu$m in diameter, between the tungsten blocks. For some operations, helium gas may be admitted to the housing to a pressure of 1–10 Torr prior to operation of the laser. The side of the housing which is not shown in the drawing is provided with a window with its normal along the x-axis and in the same x-y plane as window 38.

The x-ray laser output is along the x-axis. A spectrograph 40 and an associated image rotator 41 has been shown on the y-axis for observing the plasma condition along the y-axis.

In operation, the housing is evacuated to a vacuum pressure below 50 mTorr. The laser beam is focused to a point on the carbon target between the tungsten blocks. The laser beam ionizes the carbon target, thereby forming a plasma between the tungsten blocks. Without the tungsten blocks, plasma created by the focused laser beam would expand isotropially in a plane parallel to the target surface (the x-y plane) as well as in the y-direction. The tungsten blocks limit expansion of the plasma in the y-direction as the plasma expands in the x-z plane.

Spatially-resolved, time-integrated spectra were obtained for diagnostic purposes by viewing line segments along the x and y axes. Typical carbon spectra, transitions (subscripts) and wavelengths $\lambda$(ion Å) used were as follows: CI:$\lambda_{32}$=2479; CII:$\lambda_{32}$=2836; CIII:$\lambda_{22}$=2297; $\lambda_{64}$=2697, 2725; CIV:$\lambda_{54}$=2524, 2530; CV:$\lambda_{22}$=2271, 2277;$\lambda_{65}$=2981; CVI:$\lambda_{76}$=3434, with the high level transitions characterizing the next higher ion species. Spectra were recorded on Polaroid film using a 0.5 m Czerny-Turner type spectrograph.

The results derived from views along the x-axis indicate the emergence from the top surface of the slot of an ion beam plasma with a rectangular cross section of approximately 2×5 mm extent. Expansion along the x-axis continues to lengths of approximately 8 and 10 mm at respective distances of 2.5 and 5 mm above the top surface. Along the y-axis, ions of the lowest species expand from the top of the slot with approximately a 20° angle, as expected geometrically. However, $C^{5+}$ hydrogenic ions are apparently more restricted to a width of about 4 mm out to a distance of 5 mm above the top surface, as evidenced by 2982 Å (6-5) CV spectra. More interestingly, $C^{6+}$ stripped ions appear from 3434 Å (7-6) CVI spectra to be further contracted to a y-axis width of ~0.8 mm at a distance of 2.5 mm from the top, gradually expanding to about 1.3 mm at a distance of 5 mm. This contraction at 2.5 mm results in an aspect ratio of 10:1 for these ions, since no similar contraction is observed along the x-axis.

Such a contraction by a factor-of-25 along the y-axis results in a corresponding increase in density. Indeed, an increase in the spectral broadening of the 3434Å line indicative of $C^{6+}$ ions by such a factor is seen in both views, along the x and y axes. Following a correction for Doppler spreading in the x-direction, spectral widths of the Stark-broadened 2982 and 3434 Å lines in the CV and CVI spectra agree for all modes of viewing and indicate $C^{5+}$ and $C^{6+}$ densities $\sim 10^{16}$ cm$^{-3}$ in this region, considerably in excess of the $\sim 10^{15}$ cm$^{-3}$ expected from free expansion to 7.5 mm in vacuum without a guiding slot. It is believed that the apparent compression observed near 2.5 mm is associated with currents emerging from the plasma target interface and confined to the y-z plane somewhat in analogy to the dense plasma focus phenomenon. Tests with a helium atmosphere at an ambient pressure of 10 Torr yeild similar results; and spectral line broadening of the 3203 Å line of the He II spectrum confirm the enhancement of density in the 2.5 mm region.

Spectra from lower stages of ionization obtained along the y-axis and beginning of the carbon target surface indicate an electron density as high as $10^{19}$ cm$^{-3}$ extending as far as 3 mm above the surface. These electrons are associated in part with the tungsten blocks and perhaps are released by photoionization from target photons; the density also rises with increased helium pressure. Similar spectra of CV and CVI do not show line broadening consistent with these densities on a time-integrated bases. This implies that these ions, which are expected to expand with higher velocities of $\sim 3 \times 10^7$ cm/sec, have exited the target region prior to electron density buildup.

It has been determined that different materials may be used in lieu of the tungsten blocks, for example, glass, lucite, aluminum, etc. Further there is a very high density of electrons near the carbon target during incidence of the laser beam. These electrons may be enhanced or reduced with these other types of block material. The electron cloud may be useful in controlling the ion beam. Therefore a laser prepulse may be provided for producing an electron cloud prior to the main laser discharge. When the prepulse is properly timed, the appearance of the electron cloud may assist the ions for ion beam velocity control. Also shaping of the slot between the blocks may assist in achieving higher ion densities in a compact environment.

The above system has been described with the housing evacuated. It has been determined that a gaseous atmosphere such as helium may be added to the evacuated housing at a pressure of from 1-10 Torr for enhancement of plasma densities. Ionization obtained and beginning at the carbon target surface indicates an electron density as high as $10^{-19}$ cm$^{-3}$ extending as far as 3 mm above the target surface. These electrons are associated in part with the tungsten blocks and possible originate from photoionization from target photons. It has been determined that electron density increases with helium pressure.

The use of the tungsten blocks allows a spatially anisotropic plasma to be formed by a laser pulse focused to a point on a target. This allows maximum laser intensity to be utilized for optimum production of highly stripped ions. The plasma formed is extended to dimensions affording significant amplification and large enough for population inversions resulting in laser amplification along the x-axis.

Obviously many modifications and variations of the present invention are possible in light of the above teachings. It is therefore to be understood that within the scope of the appended claims the invention may be practiced otherwise than as specifically described.

What is claims and desired to be secured by Letters Patent of the United States is:

1. A device for producing plasmas for x-ray lasers comprising:
   a housing,
   a target material within said housing with its z-axis perpendicular to its upper surface and its x and y axes in the plane of said material.
   a first window in one side of said housing perpendicular to the y-axis of said target material,
   a second window in a second side of said housing perpendicular to the x-axis of said target material,
   a pair of spaced blocks positioned relative to said target with the spacing between said blocks centered on said x, z-axis and situated along the z-axis of said target material,
   means for evacuating said housing,
   laser means for producing an output for exciting said target material; and
   focusing means for focusing the output of said laser means to a point on said target material along the x-axis of said target material.
2. A device as claimed in claim 1 in which:
   said target material is carbon.
3. A device as claimed in claim 1 wherein:
   said pair of spaced blocks are formed of tungsten.
4. A device as claimed in claim 2 wherein:
   said pair of spaced blocks are formed of tungsten.
5. A device as claimed in claim 1 wherein:
   said focusing means is said lens.
6. A device as claimed in claim 3 wherein:
   said pair of blocks are 5 mm in height, and 12 mm in length.
7. A device as claimed in claim 4 wherein:
   said pair of blocks are 5 mm in height and 12 mm in length.
8. A device as claimed in claim 6 wherein:
   said pair of blocks are spaced 2 mm apart with the center of the spacing along the x-axis.
9. A device as claimed in claim 7 wherein:
   said pair of blocks are spaced 2 mm apart with the center of the spacing along the x-axis.
10. A device as claimed in claim 9 wherein:
    said laser means is a Nd: glass laser with a 20–30 J, 20–30 nsec pulse output.
11. A device as claimed in claim 10 wherein:
    said housing is evacuated to a pressure below 50 mTorr.
12. A device as claimed in claim 1 wherein;
    said housing is evacuated to a pressure below 50 mTorr, and
    a gas is admitted into said housing to a pressure of from 1-10 Torr.

13. A device as claimed in claim 12 wherein:
said gas admitted into said housing is helium.
14. A device as claimed in claim 13 wherein:
said gas is admitted into said housing to a pressure of about 1-10 Torr.
15. A device as claimed in claim 14 in which:
said target material is carbon.
16. A device as claimed in claim 15 wherein:
said pair of spaced blocks are formed of tungsten.
17. A device as claimed in claim 14 wherein:
said pair of spaced blocks are formed of tungsten.
18. A device as claimed in claim 13 wherein:
said focusing means is said lens.
19. A device as claimed in claim 16 wherein:
said pair of blocks are 5 mm in height and 12 mm in length.
20. A device as claimed in claim 17 wherein:
said pair of blocks are 5 mm in height and 12 mm in length.
21. A device as claimed in claim 20 wherein:
said pair of blocks are spaced 2 mm apart with the center of the spacing along the x-axis.
22. A device as claimed in claim 19 wherein:
said pair of blocks are spaced 2 mm apart with the center of the spacing along the x-axis.
23. A device as claimed in claim 22 wherein:
said laser means is a Nd: glass laser with a 20-30 J, 20-30 nsec pulse output.
24. A device as claimed in claim 23 wherein:
said housing is evacuated to a pressure of below 50 mTorr.
25. Means for controlling the geometrical configuration of a plasma produced by irradiation, by a high-power laser pulse, of an x-ray target in an evacuated enclosure having a window therein for passage of x-rays therethrough, the irradiated surface of the target being in the x-y plane and the normal to the window being along the x-axis, the irradiating pulse being projected onto the target along the z-axis, said controlling means comprising:

channeling means located adjacent to the irradiated surface of said x-ray target forming a three-dimensional channel above said target for the plasma produced by the irradiation, said channel providing space for unlimited plasma expansion in the x-and z-directions above said target but limiting plasma expansion in the y-direction, the irradiating pulse being projected onto the target through said channel, x-rays formed by said plasma propagating in the direction of said x-axis through said window.

26. Controlling means as in claim 25, wherein:
said x-ray target is made from carbon.
27. Controlling means as in claim 25, wherein said channeling means comprises:
a pair of metallic blocks, each having at least one flat surface, the flat surfaces being spaced from each other and paralleling each other to form a channel whose longitudinal axis lies in the x-axis direction.
28. Controlling means as in claim 27, wherein:
the y-axis dimension of the channel is about 2 mm., the x-axis dimension about 12 mm., and the z-axis dimension about 5 mm.
29. Controlling means as in claim 27, wherein:
the blocks are made from tungsten.
30. Controlling means as in claim 27, wherein:
the blocks are rectangular in shape.

* * * * *